Feb. 8, 1966 J. FAISANDIER 3,233,410
CONTROL DEVICE FOR DISCONTINUOUS INTERMITTENT
CONTROLLED MOVEMENT
Filed Nov. 9, 1964 3 Sheets-Sheet 1
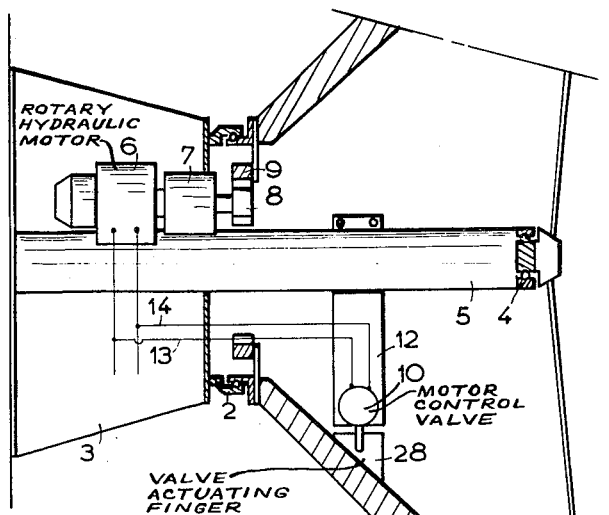
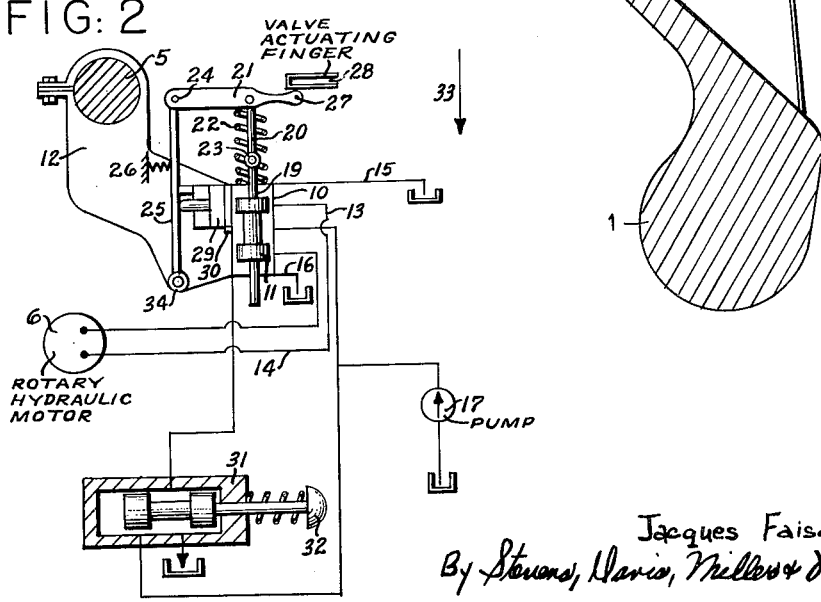
Inventor
Jacques Faisandier
By Stevens, Davis, Miller & Mosher
Attorneys Inventor
Jacques Faisandier
By Stevens, Davis, Miller & Mosher
Attorneys United States Patent Office 3,233,410
Patented Feb. 8, 1966

1

3,233,410
CONTROL DEVICE FOR DISCONTINUOUS INTERMITTENT CONTROLLED MOVEMENT
Jacques Faisandier, Chatillon-sous-Bagneux, France, assignor to Societe Anonyme dite: Societe d'Applications des Machines Matrices, Issy-les-Moulineaux (Seine), France
Filed Nov. 9, 1964, Ser. No. 409,826
Claims priority, application France, Nov. 14, 1963, 953,707
2 Claims. (Cl. 60—53)

The present invention relates to the control of a discontinuous, intermittent controlled motion.

Its object is a servo-control for stopping the controlled system after a predetermined path and after controlled return to operation, stopping it after another predetermined path, whether the second path is equal to the first or not, and so on.

The re-starting control after each path may be manual or be effected by means of a clock mechanism in accordance with a predetermined program.

It is of great interest for the control of a rotational movement, but it is also applicable to movement of translation and more generally to any curvilinear movement.

Various embodiments of the invention will be indicated below without intending to limit the generic nature of his invention to or by the specific features of the embodiments selected for illustration.

In the accompanying drawings:

FIG. 1 shows, entirely schematically, a device in accordance with the invention which is intended to control a carrousel, assumed to be soon in axial section.

FIG. 2 is a schematic plan view partially in section of the device of FIG. 1.

Figure 3:
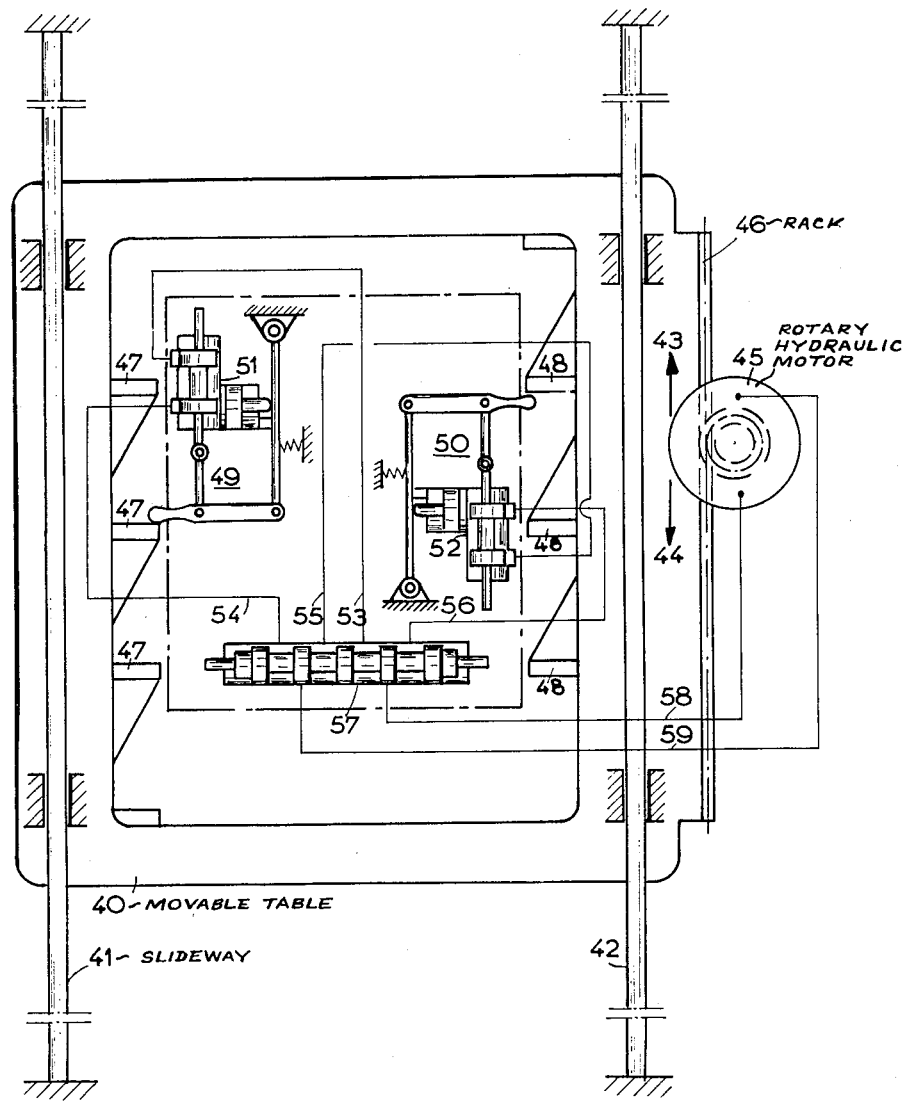
FIG. 3 is a schematic plan view of a device intended to control a movement of translation.

In FIGS. 1 and 2, there is shown diagrammatically a carrousel which may for instance be a glass-making or foundry carrousel, with the figure of revolution 1 resting via a ball-bearing 2 on a base 3 and via a ball-bearing 4 on a pivot 5.

The rotation is controlled by a hydraulic motor 6 of rotary type, for instance a barrel motor, via a speed reducer 7, the pinion 8 and the crown gear 9 rigidly connected with the carrousel 1. The motor 6 is fixed with respect to the base 3. Element 10 designates in its entirety the valve distributor of the motor 6, of the conventional so called 5-way type, closed center, the displaceable slide valve of which is designated by 11.

The distributor 10 is supported by a bracket 12, keyed in fixed position on the pivot and is connected to the motor 6 by means of the pipes 13, 14, to the tank by means of the pipes 15, 16 and to the pump 17 by means of the pipe 18.

The pump 17 is provided with any regulating device, known in the art which makes it possible to maintain a constant pressure in the distribution circuit. As these regulators are well known in various embodiments, they will not be described here. The rod 19 of the slide valve 11 is articulated to the rod 20 which in its turn is articulated to the lever 21. A return spring 22 has one end fixed and the other end firmly connected to the rod 20 so as to return the slide valve 11 upward and permit a slight angular displacement of the rod 20 around the articulation 23.

The lever 21 is articulated at 24 to the lever 25 which in its turn articulated at 34 on the bracket 12 and is subject to the action of the spring 26 which tends to push it back in clockwise direction.

2

The end 27 of the lever 21 is located on the path of the fingers 28 which are rigidly connected with the carrousel 1. If the carrousel is to stop for instance 8 times per revolution after a path of one-eighth of a revolution, 8 fingers will be distributed uniformly over a circumference, the plane of which is perpendicular to the axis of the pivot 5.

Finally, the lever 25 is subjected to the action of a small jack 29, the chamber 30 of which can be placed under pressure from the pump 17 via an hydraulic distributor 31, this distributor being controlled manually by means of the push member 32.

The operation is as follows:

In FIG. 2, the device has been shown stopped, while the finger 28, moving in the direction of the arrow 33, has already encountered and has pushed downward in the figure the end 27 of the lever 21 and, the end 24 of the lever 21 acting as a fixed point, has brought the slide 11 into the position shown, center closed, that is to say, the communication of the motor with the pump being interrupted.

If now the push member 32 is actuated, the chamber 30 of the jack 29 is placed under pressure, and the lever 25 turns in counterclockwise direction around the pivot 34; the end 27 of the lever 21 releases the finger 28 and thereby releases itself from this finger so that the rod 20 is allowed to turn freely around the articulation 23. The spring 22 causes the movement of the rod 19 and therefore of the slide valve 11 in an upward direction, the motor 6 is placed under pressure, and the carrousel starts to turn, until the following finger comes against the end 27 of the lever 21 and, pushing said end downward in the figure, causes stoppage as explained above.

The second embodiment relates to the movement of a table 40 which can, for instance, form part of a transfer machine, and which is guided in its movement by the guides 41, 42. The movement is to take place in one direction (arrow 43) or in the other (arrow 44).

The movement is controlled by a hydraulic motor 45, also of the rotary type, which displaces the table in one direction or the other by means of the rack 46 which is rigidly connected with the table 40.

The table 40 is provided with a series of fingers 47 to control the movement in the direction of the arrow 43 and with a series of fingers 48 to control the movement in the direction of the arrow 44.

A fixed assembly designated in its entirety by 49, is constituted in a manner entirely identical to the assembly constituted in FIG. 2 by the elements 10, 11, 19 to 27, 29, 32, 34 and cooperates with the fingers 47.

Another assembly 50 of identical constitution cooperates with the fingers 48.

The fixed unit of the two groups has been surrounded by a dot-dash rectangle.

The pressure arrives at 51 at the assembly 49 and at 52, at the assembly 50. The pump has not been shown. The assembly 49 is connected hydraulically to the motor 45 by the pipes 53, 54, and the assembly 50 by the pipes 55, 56. The four pipes are connected to a hydraulic valve distributor 57 of the 6-way type, center closed, which, moved toward the left, places the pipe 56 in communication with the pipe 58 and pipe 55 in communication with pipe 59 and therefore the motor 45 under pressure, causing the movement of the table in the direction of the arrow 44 and, displaced toward the right, places the pipes 54–59 and 53–58 in communication, assuring movement in the direction of the arrow 43.

The connections of the assemblies 49, 50 with the tank have not been shown; they are the same as in FIG. 2.

With each of the assemblies there is associated a hydraulic valve distributor, not shown, identical to the distributor 31 of FIG. 2.

The operation is as follows:

Starting from the position of stop shown, in order to cause movement in the direction indicated by the arrow 44, the displaceable valve of the distributor 57 is shifted toward the left and the intermittent movement is controlled by utilizing the distributor associated with the assembly 50. To control movement in the direction of the arrow 43, the displaceable valve of distributor 57 is moved back toward the neutral position shown in the drawing and then toward the right, and the intermittent movement is controlled by using the distributor associated with the assembly 49.

It is easily seen that the hydraulic unit, that is to say the motor 45, the two assemblies 49, 50 and the valve distributor 57, may be made integral in movement with the table 40, the rack 46 being on the other hand fixed in position.

Figure 4:
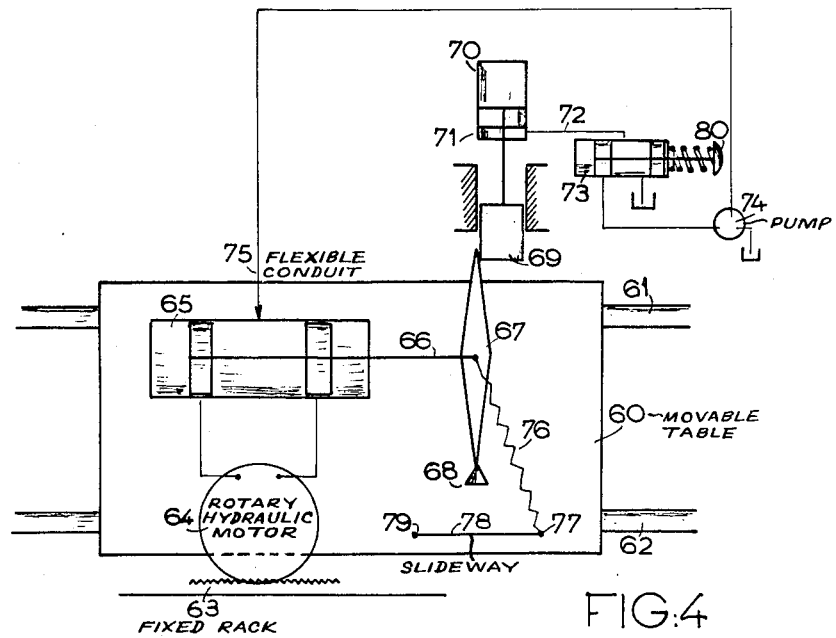
FIGS. 4 and 5 show a variant of the device of FIG. 3 for two positions of the control mechanism.

This solution has been shown in the embodiment of FIG. 4. In this embodiment, it has furthermore been shown that it is possible to make use of a single assembly. Furthermore, instead of the levers 21 giving way in front of the fingers, the fingers give way in front of the levers.

In FIG. 4, 60 is a movable table guided by the fixed slideways 61 and 62; 63 being a fixed rack and 64 a hydraulic motor of the rotary type mounted on the table 60.

A valve distributor 65 is borne by the table 60. The rod 66, of the displaceable valve controls the movements of the lever 67 pivoting around the point 68 rigidly connected with the table 60. There has been shown only a single finger 69 which can retract and is controlled by the piston of the small jack 70 in the chamber 71 in which the pressure arrives via the pipe 72 controlled by the push distributor 73, as in the first example, from the pump 74. The pressure arrives at the distributor valve 65 from the pump 74 via a pipe 75 which is flexible in whole or in part.

In the position shown in the drawing (FIGURE 4), the lever 67 is pulled back toward the right by the spring 76, one end of which is fastened to the lever 67 while the other end 77 is movable on the slideway 78 and is capable of being shifted by movement of table 60 to occupy the symmetrical position 79.

The operation is as follows:

In the position shown in the drawing (FIGURE 4), the table 60 which has just been displaced from left to right and has been stopped due to the fact that the contact of the lever 67 with the finger 69 has brought the lever 67 into the neutral position which it occupies.

Under these conditions, the valve distributor 65 has its center closed and the motor 64 which is not fed is at rest.

If, as in the first embodiment, one now acts on the push member 80 of the valve distributor 73, the chamber 71 of the jack 70 will be placed under pressure and the finger 69 will be retracted. Under these conditions, the lever 67 will be pulled back toward the right about pivot 68 by the spring 76, the slide of the valve distributor 65 will be displaced toward the right, and the movement of the table will resume toward the right.

Figure 5:
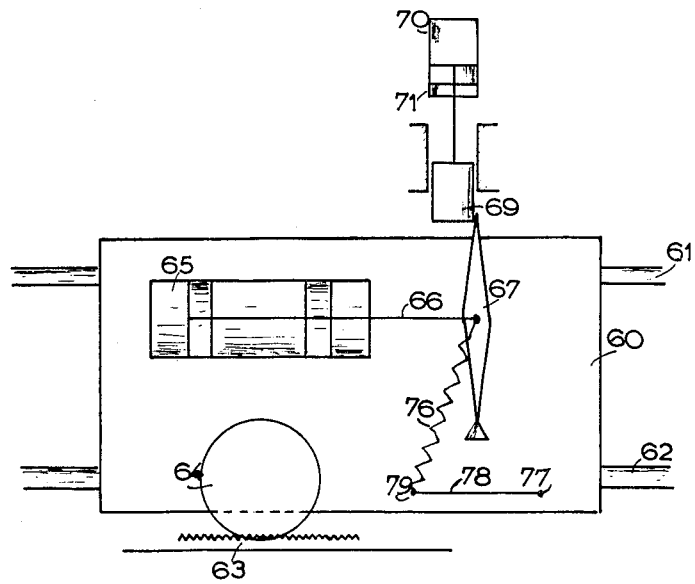

If, at any moment, it is desired to return the table toward the left, then, either manually or by a suitable device, the end 77 of the spring 76 will be displaced to bring it into the position 79, as shown in FIG. 5. Under these conditions, the lever 67 is normally pulled back toward the left, as well as the slide of the distributor 65, so that the motor 64 turns in opposite direction and therefore returns the table toward the left. If the lever 67 in its movement again comes against the finger 69, it is brought back into the neutral position shown and the movement of the motor and therefore of the table is stopped.

By retracting the finger 69, as previously, the lever 67 will be returned toward the left about pivot 68 by the spring 76, the motor will again be fed and the movement will resume toward the left.

It will be noted that the general solution given to the problem is a solution comprising a servo-control device so that there is obtained, as is known, an exponential deceleration with negative exponent, which makes it possible to obtain a stop of the movement without jolt.

What I claim is:

1. A servo control device for the control of a hydraulic motor of the rotary type comprising a distribution circuit including a pump, regulating means adapted to maintain a constant pressure in said circuit and a valve distributor of the type with closed center controlling said motor, said valve distributor including a displaceable valve element, a first displaceable member and a second displaceable member, said first displaceable member being disposed in to the path of said second displaceable member, and said valve element being displaceable in response to the movement of said first displaceable member, said second displaceable member being operatively connected with said motor to be displaced in response to the movement of said motor, characterised in that said first displaceable member is mounted to be displaceable in two directions, the first of said directions being the direction of movement of said second displaceable member and the second of said directions being perpendicular to said first direction.

2. A servo motor as set forth in claim 1 including hydraulic control means operatively connected with said first displaceable member, to displace said first member in said second direction.

No references cited.

SAMUEL LEVINE, *Primary Examiner.*

JULIUS E. WEST, *Examiner.*